US009835492B2

(12) United States Patent
Nishimura

(10) Patent No.: US 9,835,492 B2
(45) Date of Patent: Dec. 5, 2017

(54) SPECTROSCOPIC IMAGE ACQUIRING APPARATUS AND SPECTROSCOPIC IMAGE ACQUIRING METHOD

(71) Applicant: Seiko Epson Corporation, Tokyo (JP)

(72) Inventor: Teruyuki Nishimura, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/835,843

(22) Filed: Aug. 26, 2015

(65) Prior Publication Data

US 2016/0061661 A1    Mar. 3, 2016

(30) Foreign Application Priority Data

Aug. 29, 2014   (JP) ................................. 2014-175114

(51) Int. Cl.
| | | |
|---|---|---|
| *G02B 5/28* | (2006.01) | |
| *G01J 3/28* | (2006.01) | |
| *G01J 3/26* | (2006.01) | |
| *G01J 3/12* | (2006.01) | |

(52) U.S. Cl.
CPC .............. *G01J 3/2823* (2013.01); *G01J 3/26* (2013.01); *G01J 2003/1239* (2013.01)

(58) Field of Classification Search
CPC .. G01J 3/2823; G01J 3/26; G02B 5/28; G02B 5/284; G02B 5/285
USPC ................................................. 356/454, 519
See application file for complete search history.

(56) References Cited

U.S. PATENT DOCUMENTS

| | | | | |
|---|---|---|---|---|
| 5,442,438 | A * | 8/1995 | Batchelder | G01J 3/12 356/301 |
| 8,497,990 | B2 | 7/2013 | Nozawa | |
| 8,860,950 | B2 | 10/2014 | Urushidani | |
| 2008/0100827 | A1* | 5/2008 | Chang | G01J 3/10 356/51 |
| 2010/0211333 | A1* | 8/2010 | Pruet | G01J 3/0208 702/51 |
| 2010/0245832 | A1* | 9/2010 | Saari | G01J 3/02 356/454 |

FOREIGN PATENT DOCUMENTS

| | | |
|---|---|---|
| JP | 2009-141842 A | 6/2009 |
| JP | 2012-022083 A | 2/2012 |
| JP | 5609542 B2 | 10/2014 |

* cited by examiner

*Primary Examiner* — Jonathan Hansen
(74) *Attorney, Agent, or Firm* — Harness, Dickey & Pierce, P.L.C.

(57) ABSTRACT

A spectroscopic camera is provided with a wavelength variable interference filter including a pair of reflection films and an electrostatic actuator for changing a size of a gap between the reflection films; an imaging unit including a plurality of imaging pixels; and a filter control unit for controlling the electrostatic actuator based on light-received wavelength data in which a control amount for receiving light of a target wavelength is recorded with respect to each of the imaging pixels of the imaging unit. An acquisition order of the target wavelength emitted from the wavelength variable interference filter is set for each of the imaging pixels, and the acquisition order is set in a descending order of the driving amount of a gap, and thus a value for emitting the light of the target wavelength in the set acquisition order is recorded as the light-received wavelength data.

8 Claims, 9 Drawing Sheets

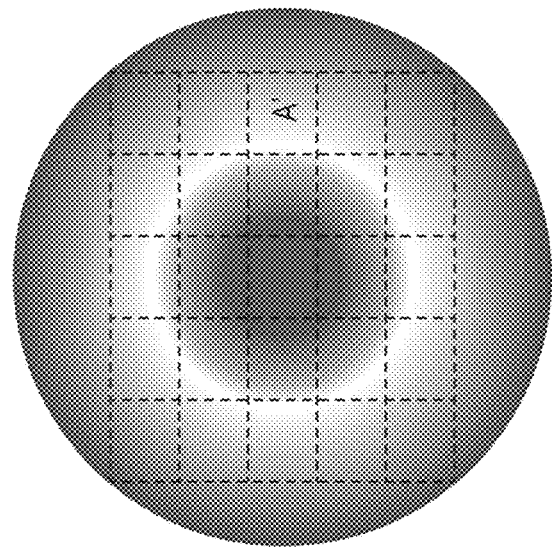
FIG. 9
PERFORM AVERAGING PROCESS
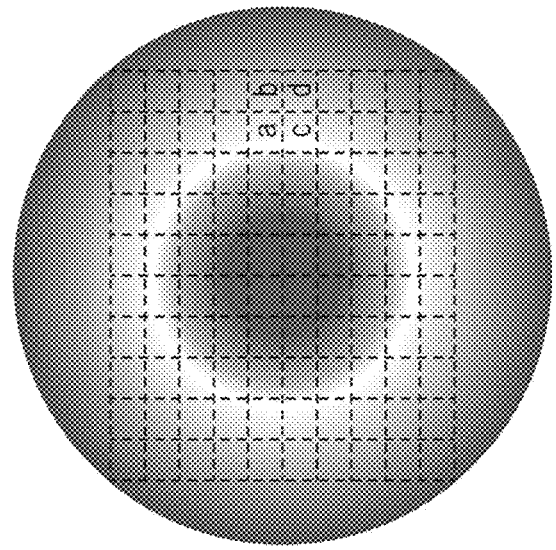

SPECTROSCOPIC IMAGE ACQUIRING APPARATUS AND SPECTROSCOPIC IMAGE ACQUIRING METHOD

BACKGROUND

1. Technical Field

The present invention relates to a spectroscopic image acquiring apparatus and a spectroscopic image acquiring method.

2. Related Art

In the related art, a Fabry-Perot interference filter (an interference filter) which causes a pair of reflection films to face each other and causes a predetermined wavelength among incident light beams, which is strengthened by being multiply interfered by the pair of reflection films, to transmit therethrough has been known. In addition, an imaging apparatus which is provided with such an interference filter, an imaging element, and an imaging optical system which forms an image on the imaging element by using the light transmitting through the interference filter, and captures a spectroscopic image is known (for example, refer to JP-A-2009-141842).

Incidentally, in an interference filter which is capable of changing a size of a gap between the reflection films, the gap size may be not uniform due to the deflection of a substrate or a reflection film at the time of changing the gap size, a manufacturing error, or the like in some cases. In this case, there is a problem that light beams having different wavelengths arrive at each pixel of the imaging element, and thereby it is difficult to acquire a highly precise spectroscopic image.

In contrast, a method of acquiring the wavelength of the light received in each pixel of each of the imaging elements in advance, and then sequentially changing the size of the gap between the reflection films so as to acquire a predetermined wavelength in each pixel has been considered.

However, in the above-described method, when detecting the light of each target wavelength which transmits through the interference filter by using only a single order of a peak wavelength (for example, a second peak wavelength), if an acquisition target wavelength band is large, the size of the initial gap between the reflection films is required to be large, and thus it is difficult to perform gap control.

In contrast, it is possible to resolve the above problem by setting the acquisition order with respect to the target wavelength among light beams which transmit through the interference filter. For example, a first wavelength band in a range of 400 nm to 600 nm detects the light transmitting through the interference filter as a second peak wavelength, and a second wavelength band in a range of 620 nm to 700 nm detects the light transmitting through the interference filter as a first peak wavelength. However, in this case, the gap size corresponding to each of the target wavelengths is required to be set corresponding to each of the imaging pixels, and thus an amount of change of the gap size (a driving amount) increases, thereby increasing the number of times of measurement. Accordingly, there is a problem in that it takes a long time to perform the measurement.

SUMMARY

An advantage of some aspects of the invention is to provide a spectroscopic image acquiring apparatus and a spectroscopic image acquiring method, which are capable of rapidly acquiring a highly precise spectroscopic image.

According to one application example of the invention, there is provided a spectroscopic image acquiring apparatus including: a wavelength variable interference filter which includes a pair of reflection films facing each other, and a gap changing unit for changing a size of a gap between the pair of reflection films, and emits light beams of wavelengths corresponding to a plurality of orders; an imaging unit which includes a plurality of imaging pixels, and receives the light beams emitted from the wavelength variable interference filter; and a filter control unit which controls the gap changing unit so as to change the gap size based on light-received wavelength data including a control amount of the gap changing unit at the time of receiving light of a predetermined target wavelength in each of the imaging pixels in the imaging unit. The light-received wavelength data includes an acquisition order which is set in each of the imaging pixels at the time of emitting the target wavelength from the wavelength variable interference filter, and the control amount for emitting the light of the target wavelength in the set acquisition order, and the acquisition order is set in an order of changing the driving amount of the gap size in a driving area in one direction.

In this application example, the filter control unit controls the gap changing unit of the wavelength variable interference filter on the light-received wavelength data. At this time, the filter control unit acquires the light-received wavelength data indicating the acquisition order in which the light of the target wavelength which is emitted from the wavelength variable interference filter is received in each of the imaging pixels in the imaging unit, and controls the gap changing unit based on the light-received wavelength data. Here, the acquisition order is set in order of the changing driving amount in one direction in a driving area of the gap size (for example, in order of small driving amount).

In this application example, with respect to the target wavelength, it is possible to decrease the number of times of changing (the number of times of measurement) the gap size and to decrease the driving amount compared with a case where the order of emission of the target wavelength from the wavelength variable interference filter is fixed.

For example, in the related art, at the time of acquiring a target wavelength λ1 as the second peak wavelength, it is assumed that it is necessary to set a size of a gap between the reflection films on an optical path of the light incident on the imaging pixel A as G1, and to set a size of a gap between the reflection films on the optical path of the light incident on the imaging pixel B as G2. In this case, in order to detect the light amount of the target wavelength λ1 in each of the imaging pixels A and B, it is necessary to control the gap changing unit by a using control amount V2 in such a manner that the size of the gap between the reflection films corresponding to the imaging pixel B is set as G2 after controlling the gap changing unit by using a control amount V1 in such a manner that the size of the gap between the reflection films corresponding to the imaging pixel A is set as G1.

Here, when the size of the gap between the reflection films on the optical path of the light incident on the imaging pixel A is set as G1, the size of the gap between the reflection films on the optical path of the light incident on the imaging pixel B becomes G1', and at that time, it is assumed that the target wavelength λ1 (or other target wavelengths λ2) is emitted from the wavelength variable interference filter as the first peak wavelength with respect to the imaging pixel B. In the application example, in such a case, the light of the target wavelength λ1 which is emitted from the wavelength variable interference filter as the second peak wavelength is detected in the imaging pixel A, and the light of the target wavelength λ1 (or the target wavelength λ2) which is emitted from the wavelength variable interference filter as the first peak wavelength is detected in the imaging pixel B. Accordingly, when controlling the gap changing unit by using the control amount V1, the filter control unit can acquire the target wavelengths in both of the imaging pixels A and B. That is, it is possible to decrease the number of times of driving the gap changing unit, and a necessary amount of driving the gap size compared with a case of receiving the light of the target wavelength with a single order, thereby rapidly acquiring a spectroscopic image. In addition, the wavelength of the light received in each of the imaging pixels is recorded in the light-received wavelength data, and thus it is possible to detect the wavelength of the light received in each of the imaging pixels with high precision, thereby acquiring a highly precise spectroscopic image.

In the spectroscopic image acquiring apparatus according to the application example, preferably, the target wavelength is set in each of the imaging pixels.

In the application example, each of the target wavelengths is set with respect to each of the imaging pixels in the light-received wavelength data. For example, in a case where the target wavelength is set in a range of 400 nm to 700 nm at an interval of 20 nm in the imaging pixel A, the target wavelength may be set in a range of 401 nm to 701 nm at the interval of 20 nm in the imaging pixel B. That is, the target wavelength in the imaging pixel A and the target wavelength in the imaging pixel B are not necessarily the same as each other.

In a case where the target wavelength is determined regardless of the imaging pixel, it is necessary to set a large number of control amount such that the light of the target wavelength is received in each of the imaging pixels, and thus the number of times of measurement is increased. In contrast, in the application example, each of the target wavelengths is set with respect to each of the imaging pixels. That is, with respect to a predetermined number of control amount, it is possible to set the wavelength of the light received in each of the imaging pixels at the time of controlling the gap changing unit by using the control amount as a target wavelength in each of the imaging pixels. Accordingly, the number of setting the control amount is not increased, and thus the number of times of measurement is not increased, thereby rapidly acquiring a spectroscopic image.

In the spectroscopic image acquiring apparatus according to the application example, preferably, each of the imaging pixels in the imaging unit is divided into a plurality of pixel groups based on variation of the size of the gap between the pair of reflection films on an optical path of the light received in the imaging pixel, and the light-received wavelength data includes the target wavelength with respect to each of the pixel groups, and the control amount of the gap changing unit at the time of receiving the light of the target wavelength.

In the application example, the plurality of imaging pixels are set as one pixel group, and the target wavelength and the acquisition order thereof are set with respect to each pixel group. Here, each pixel group is set based on the variation of the size of the gap between the reflection films positioned on the optical path of the light incident on the imaging pixel. That is, the imaging pixel which corresponds to a portion which has the same level of the variation in accordance with the variation of the gap size belongs to the same pixel group.

Therefore, the light having substantially the same wavelength is received in each of the imaging pixels included in the pixel group. Accordingly, a difference between the wavelength of the light actually received in each of the imaging pixels and the target wavelength is small to the extent of being negligible, and thus does not affect measuring accuracy.

In such a configuration, it is possible to decrease the number of setting times of the target wavelength and the acquisition order compared with a case of independently setting the target wavelength and the acquisition order thereof with respect to each of the imaging pixels. Therefore, it is possible to simplify a configuration of the light-received wavelength data, and to decrease the driving amount of the gap size or the number of times of measurement by the filter control unit, thereby realizing a more rapid process.

In the spectroscopic image acquiring apparatus according to the application example, preferably, the filter control unit sequentially changes the gap size at a measurement interval in accordance with a predetermined wavelength resolution by controlling the gap changing unit, and each of the imaging pixels in the imaging unit is divided into the plurality of pixel groups in which the variation of the gap size is divided by a length unit which is less than the wavelength resolution.

In the application example, the variation of the gap size is divided by a length unit which is less than the wavelength resolution, and each of the imaging pixels are divided into the plurality of pixel groups. That is, in the application example, the variation of the gap sizes corresponding to each of the imaging pixels included in the same pixel group is less than the wavelength resolution, and thus the variation of the wavelength of the light received is less than the wavelength resolution. In such a configuration, an adverse effect on accuracy at the time of acquiring a spectroscopic image is very small, and therefore, it is possible to rapidly acquire a spectroscopic image with high precision.

In the spectroscopic image acquiring apparatus according to the application example, preferably, each of the pixel groups includes a plurality of imaging pixels which are close to each other, and the light-received wavelength data stores, as the target wavelength, an average value of a wavelength of light received in each of the plurality of the imaging pixels included in the pixel groups, with respect to the pixel groups.

In the application example, the imaging pixels which are close to each other are set as the pixel group, and an average value of the wavelength of the light actually received in the imaging pixel forming the pixel group is employed as the target wavelength with respect to the pixel group. In such a configuration, it is possible to realize a rapid process of capturing the spectroscopic image in which the pixel group is replaced with one imaging pixel.

According to another application example of the invention, there is provided a spectroscopic image acquiring method in spectroscopic image acquiring apparatus which includes a wavelength variable interference filter which includes a pair of reflection films facing each other, and a gap changing unit for changing a size of a gap between the pair of reflection films, and emits light beams of wavelengths corresponding to a plurality of orders, and an imaging unit which includes a plurality of imaging pixels, and receives the light emitted from the wavelength variable interference filter, the method including: acquiring light-received wavelength data including a control amount of the gap changing unit at the time of receiving light of a predetermined target wavelength in each of the imaging pixels in the imaging unit; and changing the gap size by controlling the gap changing unit based on the light-received wavelength data. The light-received wavelength data includes an acquisition order which is set in each of the imaging pixels at the time of emitting the target wavelength from the wavelength variable interference filter, and the control amount for emitting the light of the target wavelength in the set acquisition order, and the acquisition order is set in an order of changing the driving amount of the gap size in a driving area in one direction.

In this application example, the light-received wavelength data indicating acquisition order in which the light of the target wavelength which is emitted from the wavelength variable interference filter is received in each of the imaging pixels in the imaging unit is acquired, and the gap changing unit is controlled based on the light-received wavelength data, and thus it is possible to acquire the highly precise spectroscopic image. In addition, the acquisition order is set so as to acquire the target wavelength in order of changing the driving amount in one direction in a driving area of the gap size (for example, in an ascending order of driving amount). Therefore, it is possible to decrease the number of times of changing the gap size (the number of times of measurement) and to decrease the driving amount compared with a case where the light of the target wavelength is received in each of the imaging pixels based on a single order of light emitted from the wavelength variable interference filter.

According to a still another application example of the invention, there is provided a spectroscopic image acquiring apparatus including: a wavelength variable interference filter which includes a first reflection film, and a second reflection film facing the first reflection film, and a gap changing unit for changing a gap between the first reflection film and the second reflection film; an imaging unit which receives light from the wavelength variable interference filter; and a filter control unit which controls the gap changing unit so as to change the gap size based on light-received wavelength data including a control amount of the gap changing unit at the time of receiving light of a predetermined target wavelength in each of a plurality of imaging pixels which are included in the imaging unit, in which the light-received wavelength data includes an acquisition order, for each of the plurality of imaging pixels, when the wavelength variable interference filter causes the light of the target wavelength to transmit therethrough, and the control amount for transmitting the light of the target wavelength in the acquisition order, and in which the gap is sequentially changed in one direction.

BRIEF DESCRIPTION OF THE DRAWINGS

The invention will be described with reference to the accompanying drawings, wherein like numbers reference like elements.

FIG. 9 is a diagram illustrating wavelength distribution of light which transmits through the wavelength variable interference filter, an image range of a captured image, and a synthesized image generated in a fourth embodiment.

DESCRIPTION OF EXEMPLARY EMBODIMENTS

First Embodiment

Hereinafter, a spectroscopic camera which is a spectroscopic image acquiring apparatus of the first embodiment according to the invention will be described with reference to the drawings.

Schematic Configuration of Spectroscopic Camera

Figure 1:
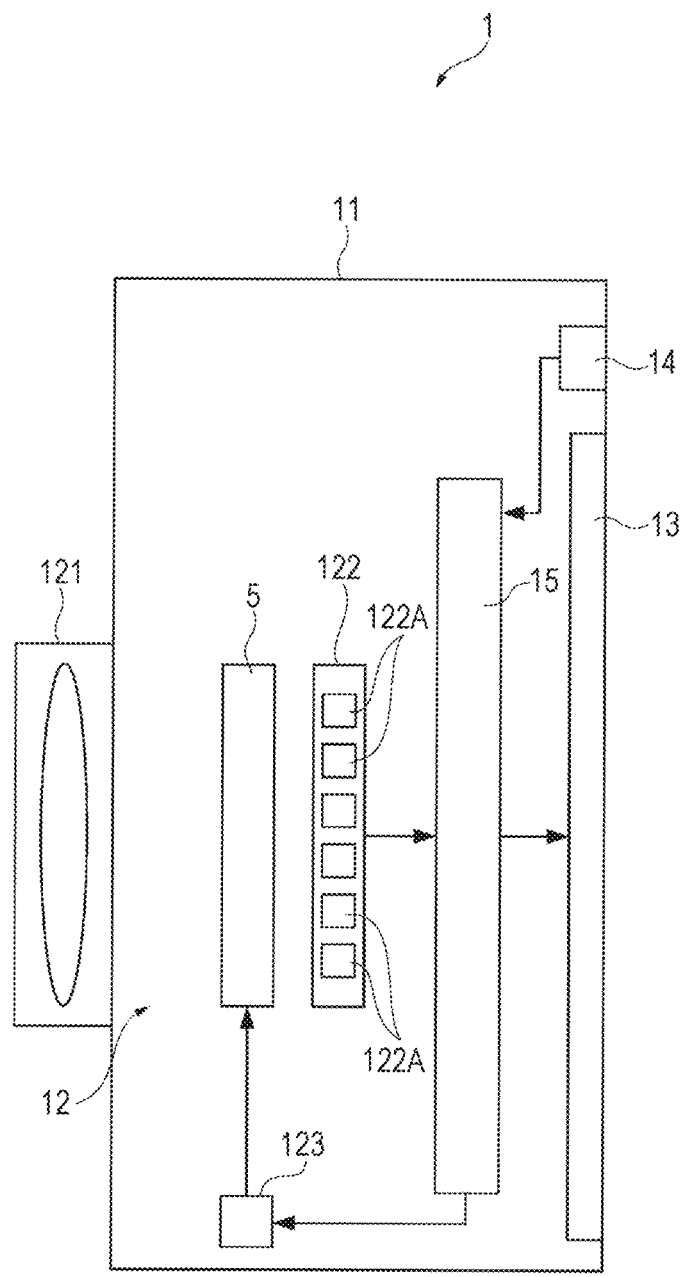
FIG. 1 is a diagram illustrating a schematic configuration of a spectroscopic camera of a first embodiment according to the invention.

FIG. 1 is a schematic diagram illustrating a schematic configuration of a spectroscopic camera of a first embodiment according to the invention.

A spectroscopic camera 1 corresponds to a spectroscopic image acquiring apparatus, and is an apparatus for capturing a spectroscopic image to be acquired.

The spectroscopic camera 1 is provided with, as illustrated in FIG. 1, an imaging module 12, a display 13, an operating unit 14, and a control unit 15, which are stored in an external housing 11. The spectroscopic camera may be, for example, various existing devices having a camera function, which are, for example, a smart phone, a tablet terminal, a digital still camera, and the like. In addition, the spectroscopic camera 1 may include a light source. Examples of the light source can be selected in accordance with the spectroscopic image to be acquired, for example, when acquiring the spectroscopic image in a near-infrared area, a near infrared ray LED or the like can be used.

Configuration of Imaging Module

The imaging module 12 acquires an image by receiving incident light. The imaging module 12 is provided with an incident optical system 121, a wavelength variable interference filter 5 which is a spectroscopic filter of the invention, an imaging unit 122, and a filter driving circuit 123.

Configuration of Incident Optical System

The incident optical system 121 forms an image in the imaging unit 122 by using light (a target image) incident from an incident window which is provided in the external housing 11. Examples of the incident optical system 121 include a telecentric optical system and the like which guide the incident light such that a main optical axis of the light is parallel to the wavelength variable interference filter 5.

Configuration of Imaging Unit

The imaging unit 122 can use, for example, an image sensor such as a CCD or a CMOS. The imaging unit 122 has a two-dimensional array structure in which the imaging pixel 122A corresponding to each pixel of the captured image is disposed in a matrix shape. Then, each of the imaging pixels 122A outputs a signal value based on the amount of the received light to the control unit 15.

Note that, in the embodiment, for the sake of simple description, it is assumed that sensitivity is constant in each of the imaging pixels, and the sensitivity is constant in each of the wavelength components in a spectroscopic wavelength band.

Configuration of Wavelength Variable Interference Filter

Figure 2:
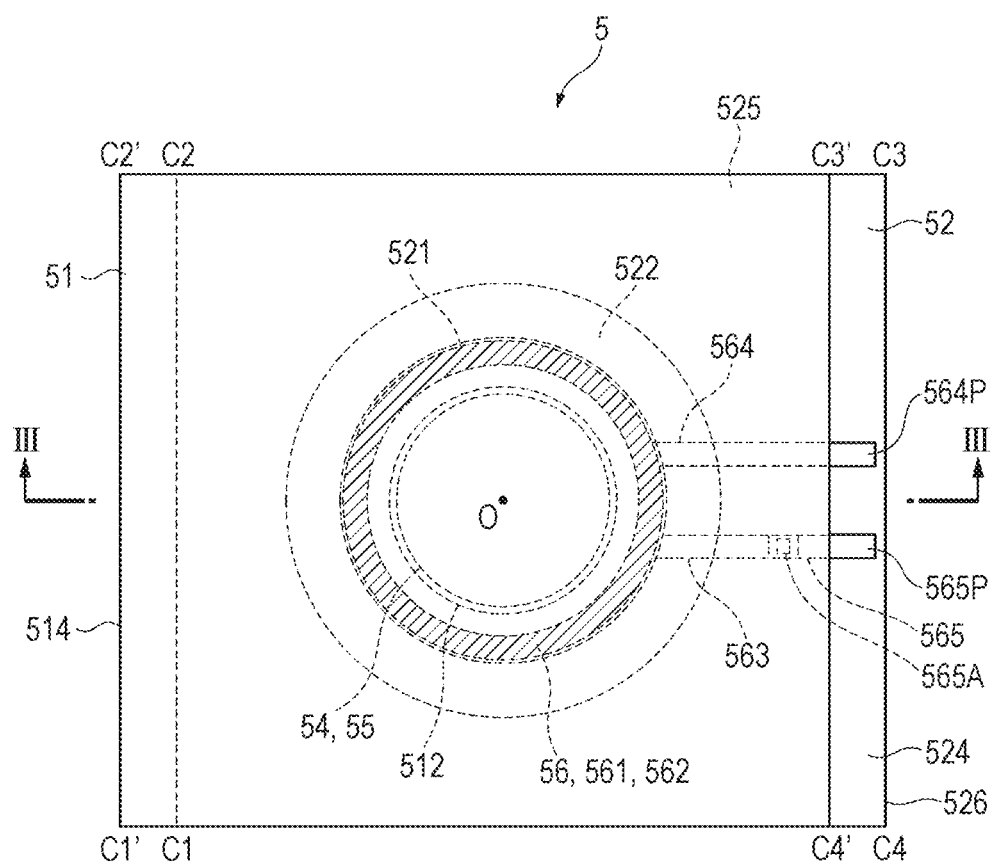
FIG. 2 is a plan view illustrating a schematic configuration of a wavelength variable interference filter in the embodiment.
Figure 3:
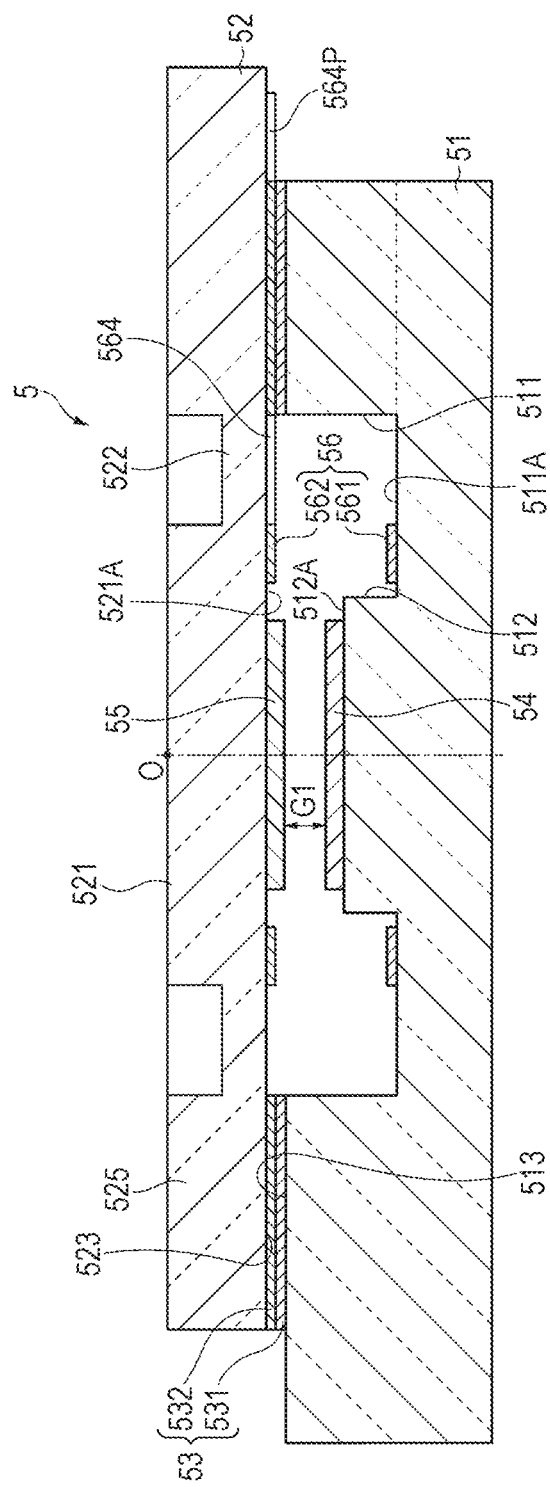
FIG. 3 is a schematic sectional view at the time of cutting the wavelength variable interference filter along line III-III in FIG. 2.

FIG. 2 is a plan view illustrating a schematic configuration of a wavelength variable interference filter 5. FIG. 3 is a schematic sectional view at the time of cutting the wavelength variable interference filter 5 along line III-III in FIG. 2.

The wavelength variable interference filter 5 is provided with a fixation substrate 51 and a movable substrate 52 as illustrated in FIG. 2 and FIG. 3. Each of the fixation substrate 51 and the movable substrate 52 is formed of, for example, various types of glass or the liquid crystal, and is formed of quartz glass in the embodiment. In addition, these substrates 51 and 52 are integrally formed by being bonded to each other through the bonding film 53 (a first bonding film 531 and a second bonding film 532) as illustrated in FIG. 3. Specifically, a first bonding portion 513 of the fixation substrate 51, and a second bonding portion 523 of the movable substrate 52 are bonded to each other through the bonding film 53 such as a plasma polymerization film composed mainly of siloxane, for example.

Meanwhile, in the following description, in a planar view seen from a substrate thickness direction of the fixation substrate 51 or the movable substrate 52, in other words, in a planar view of the wavelength variable interference filter 5 seen from the laminating direction of the fixation substrate 51, the bonding film 53, and the movable substrate 52 is referred to as a filter planar view.

As illustrated in FIG. 3, a fixation reflection film 54 which forms one of a pair of reflection films of the invention is provided in the fixation substrate 51. In addition, a movable reflection film 55 which forms the other of the pair of reflection films of the invention is provided in the movable substrate 52. The fixation reflection film 54 and the movable reflection film 55 are disposed to face each other via a gap G1 between the reflection films.

In addition, the wavelength variable interference filter 5 is provided with an electrostatic actuator 56 which is a gap changing unit of the invention and is used to adjust a distance (a gap size) of the gap G1 between reflection films 54 and 55. The electrostatic actuator 56 is provided with a fixation electrode 561 which is provided on the fixation substrate 51 and a movable electrode 562 which is provided on the movable substrate 52, and is configured such that the electrodes 561 and 562 face each other. The fixation electrode 561 and the movable electrode 562 face each other via the gap between electrodes. Here, these electrodes 561 and 562 may be directly provided on the substrate surface of each of the fixation substrate 51 and the movable substrate 52, and may be provided via another film material.

Note that, in the embodiment, the gap G1 between the reflection films is formed to be smaller than a gap between electrodes, but, for example, depending on the light of the wavelength band which transmits through the wavelength variable interference filter 5, the gap G1 between the reflection films may be formed to be larger than the gap between electrodes.

In addition, in a planar view of the filter, one side of the movable substrate 52 (for example, a side C3-C4 in FIG. 2) is projected outward from the side C3'-C4' of the fixation substrate 51. A projected portion of the movable substrate 52 corresponds to the electrical portion 526 which is not bonded to the fixation substrate 51, and a surface exposing the wavelength variable interference filter 5 when seen from the fixation substrate 51 side corresponds to the electrical surface 524 on which electrode pads 564P and 565P are provided described later.

In the same way, in a planar view of the filter, one side (the side opposite to the electrical portion 526) of the fixation substrate 51 is projected outward from the movable substrate 52.

Configuration of Fixation Substrate

An electrode deposition groove 511 and a reflection film installation portion 512 are formed on the fixation substrate 51 through etching. The fixation substrate 51 is formed so that the thickness thereof is greater than that of the movable substrate 52, and the fixation substrate 51 is not deflected due to the electrostatic attractive force when a voltage is applied between the fixation electrode 561 and the movable electrode 562, and an inner stress of the fixation electrode 561.

The electrode deposition groove 511 is formed into an annular shape which is centered on the center point O of the filter of the fixation substrate 51 in a planar view of the filter. The reflection film installation portion 512 is formed to be projected to the movable substrate 52 from the center portion of the electrode deposition groove 511 in the planar view. A groove bottom surface of the electrode deposition groove 511 corresponds to an electrode installation surface 511A on which the fixation electrode 561 is disposed. In addition, a projecting tip end surface of the reflection film installation portion 512 corresponds to a reflection film installation surface 512A.

The fixation electrode 561 which forms the electrostatic actuator 56 is provided on the electrode installation surface 511A. The fixation electrode 561 is provided in an area facing the movable electrode 562 of the movable portion 521 described above in the electrode installation surface 511A. In addition, an insulating film for securing insulating properties between the fixation electrode 561 and the movable electrode 562 may be laminated on the fixation electrode 561.

In addition, the fixation substrate 51 is provided with a fixed extraction electrode 563 which is connected to an outer circumferential edge of the fixation electrode 561. The fixed extraction electrode 563 is provided along a connection electrode groove (not shown) which is formed to the side C3'-C4' (the side of the electrical portion 526) from the electrode deposition groove 511. The connection electrode groove is provided with a bump portion 565A which is projected to the movable substrate 52, and the fixed extraction electrode 563 extends to above the bump portion 565A. Then, above the bump portion 565A, the fixed extraction electrode 563 comes in contact with and is electrically connected to the fixed connection electrode 565 which is provided on the movable substrate 52. The fixed connection electrode 565 extends to the electrical surface 524 from the area facing the connection electrode groove, and forms a fixation electrode pad 565P in the electrical surface 524.

Note that, in the embodiment, the electrode installation surface 511A is provided with one fixation electrode 561, but, for example, a configuration (a double electrode configuration) in which two electrodes corresponding to a concentric circle which is centered on the center point O of the filter are provided may be employed. In addition, a transparent electrode may be provided on the fixation reflection film 54, and the connection electrode may be formed in an electrical portion on a fixation side from the fixation reflection film 54 by using a conductive fixation reflection film 54. In this case, in accordance with the connection electrode, a portion of the fixation electrode 561 may be notched.

As described above, the reflection film installation portion 512 is formed into a substantially cylindrical shape, of which the diameter size is smaller than the electrode deposition groove 511 on the same axis as that of the electrode deposition groove 511, and is provided with a reflection film installation surface 512A facing the movable substrate 52 of the aforementioned reflection film installation portion 512.

As illustrated in FIG. 3, the fixation reflection film 54 is installed in the reflection film installation portion 512. Examples of the fixation reflection film 54 include a metallic film such as Ag and an alloy film such as an Ag alloy. In addition, for example, a dielectric multilayer film in which a high refractive layer is formed of $TiO_2$, and a low refractive layer is formed of $SiO_2$ may be used. Further, a reflection film in which the metallic film (or the alloy film) is laminated with the dielectric multilayer film, a reflection film in which the metallic film (or the alloy film) is laminated on the dielectric multilayer film, and a reflection film in which a single refractive layer (such as $TiO_2$ or $SiO_2$) and the metallic film (or the alloy film) are laminated to each other may be used.

In addition, on a light incident surface (a surface on which the fixation reflection film 54 is not provided) of the fixation substrate 51, an antireflection film may be formed at a position corresponding to the fixation reflection film 54. The antireflection film can be formed by alternately laminating the low refractive index film and the high refractive index film, and the transmittance is increased by deteriorating the reflectance of visible light on the surface of the fixation substrate 51.

In addition, the first bonding portion 513 is formed on a surface on which the electrode deposition groove 511, the reflection film installation portion 512, and the connection electrode groove are not formed through etching, in the surface facing the movable substrate 52 of the fixation substrate 51. The first bonding portion 513 is provided with the first bonding film 531, and the first bonding film 531 is bonded to the second bonding film 532 which is provided on the movable substrate 52, as described above, and thus the fixation substrate 51 and the movable substrate 52 are bonded to each other.

Configuration of Movable Substrate

The movable substrate 52 is provided with the circular shaped movable portion 521 which is centered on the center point O of the filter, and a holding portion 522 which is on the same axis as that of the movable portion 521 and holds the movable portion 521.

The movable portion 521 is formed such that the thickness thereof is greater than that of the holding portion 522. The size of a diameter of the movable portion 521 is formed to be greater than at least the size of a diameter of an outer circumferential edge of the reflection film installation surface 512A, in planar view of the filter. In addition, the movable portion 521 is provided with the movable electrode 562 and the movable reflection film 55.

Note that, similar to the fixation substrate 51, the antireflection film may be formed on a surface of the side of the movable portion 521 opposite to the fixation substrate 51. The antireflection film can be formed by alternately laminating the low refractive index film and the high refractive index film, and the transmittance is increased by deteriorating the reflectance of visible light on the surface of the movable substrate 52.

The movable electrode 562 faces the fixation electrode 561 via a predetermined gap between electrodes, and is formed into the annular shape which is the same shape of the fixation electrode 561. The movable electrode 562 and the fixation electrode 561 form the electrostatic actuator 56. In addition, the movable substrate 52 is provided with the movable connection electrode 564 which is connected to the outer circumferential edge of the movable electrode 562. The movable connection electrode 564 is provided over the electrical surface 524 from the movable portion 521 along the position facing the connection electrode groove (not shown) which is provided on the fixation substrate 51, and forms a movable electrode pad 564P which is electrically connected to an inner side terminal portion on the electrical surface 524.

In addition, as described above, the movable substrate 52 is provided with the fixed connection electrode 565, and the fixed connection electrode 565 is connected to the fixed extraction electrode 563 via the bump portion 565A (refer to FIG. 2).

The movable reflection film 55 is provided in a center portion of a movable surface 521A of the movable portion 521 so as to face the fixation reflection film 54 via the gap G1. As the movable reflection film 55, a reflection film which has the same configuration as that of the aforementioned fixation reflection film 54 can be used.

As described above, in the embodiment, the size of the gap between electrodes is greater than the size of the gap G1 between the reflection films, but the size is not limited thereto. For example, the size of the gap G1 may be greater than the size of the gap between electrodes depending on an acquisition target wavelength band of the spectroscopic image, for example, in a case of using infrared rays or far infrared rays.

The holding portion 522 is a diaphragm surrounding the movable portion 521, and is formed such that the thickness thereof is smaller than that of the movable portion 521. Such a holding portion 522 is easily deflected compared to the movable portion 521, and it is possible to displace the movable portion 521 to the fixation substrate 51 side by using a small electrostatic attractive force. At this time, the thickness of the movable portion 521 is greater than that of the holding portion 522, and the rigidity becomes enhanced. Therefore, even in a case where the holding portion 522 is pulled to the fixation substrate 51 side due to the electrostatic attractive force, the shape of the movable portion 521 is not changed. Accordingly, the movable reflection film 55 which is provided in the movable portion 521 is not deflected, and it is possible to maintain a state where the fixation reflection film 54 and the movable reflection film 55 are constantly parallel to each other.

Note that, in the embodiment, the diaphragm-shaped holding portion 522 is described as an example, but the shape of holding portion 522 is not limited thereto. For example, a beam-like holding portion which is disposed at equal angular intervals may be provided centering around the center point O of the filter.

In the movable substrate 52, an area facing the first bonding portion 513 corresponds to the second bonding portion 523. The second bonding portion 523 is provided with a second bonding film 532, and as described above, the second bonding film 532 is bonded to the first bonding film 531, and thus, the fixation substrate 51 and the movable substrate 52 are bonded to each other.

Configuration of Filter Driving Circuit

The filter driving circuit 123 applies a driving voltage to the electrostatic actuator 56 in the wavelength variable interference filter 5 based on a command signal from the control unit 15. With this, the electrostatic attractive force occurs between the fixation electrode 561 and the movable electrode 562 of the electrostatic actuator 56, and the movable portion 521 is displaced to the fixation substrate 51 side. The size of the gap G1 of the wavelength variable interference filter 5 is set to be a predetermined value.

In such a case, although the illustration of the drawing is omitted, the imaging module 12 is provided with the band pass filter, through which the light of an acquisition target wavelength band of the spectroscopic image transmits, and then which shields light other than the aforementioned light, on the optical path of the light which is incident on the imaging unit 122. In the embodiment, the wavelength band in a range of 400 nm to 700 nm is set as the acquisition target wavelength band, and thus the wavelength which is longer than 700 nm, and the wavelength which is shorter than 400 nm are shielded.

The position of the band pass filter may be between the wavelength variable interference filter 5 and the imaging unit 122, between the wavelength variable interference filter 5 and the incident optical system 121, or between lens groups in the incident optical system 121. In addition, the band pass filter may be detachably provided on the light-incident side of the incident optical system 121, and in this case, it is possible to change the acquisition target wavelength band by changing the types of the band pass filters.

Configuration of Display

The display 13 is provided in the external housing 11 so as to face the display window. Examples of the display 13 may include any one as long as it has a configuration capable of displaying an image, for example, a liquid crystal display or an organic EL display can be used.

In addition, the display 13 in the embodiment may be provided with a touch panel, and the touch panel may be set as one component of the operating unit 14.

Configuration of Operating Unit

The operating unit 14 is formed of, as described above, the shutter button which is provided in the external housing 11, and the touch panel which is provided in the display 13. When an input operation is performed by a user, the operating unit 14 outputs an operation signal to the control unit 15 in response to the input operation. Note that, the components of the operating unit 14 are not limited to the above configuration, for example, a plurality of operation buttons may be provided instead of the touch panel.

Configuration of Control Unit

Figure 4:
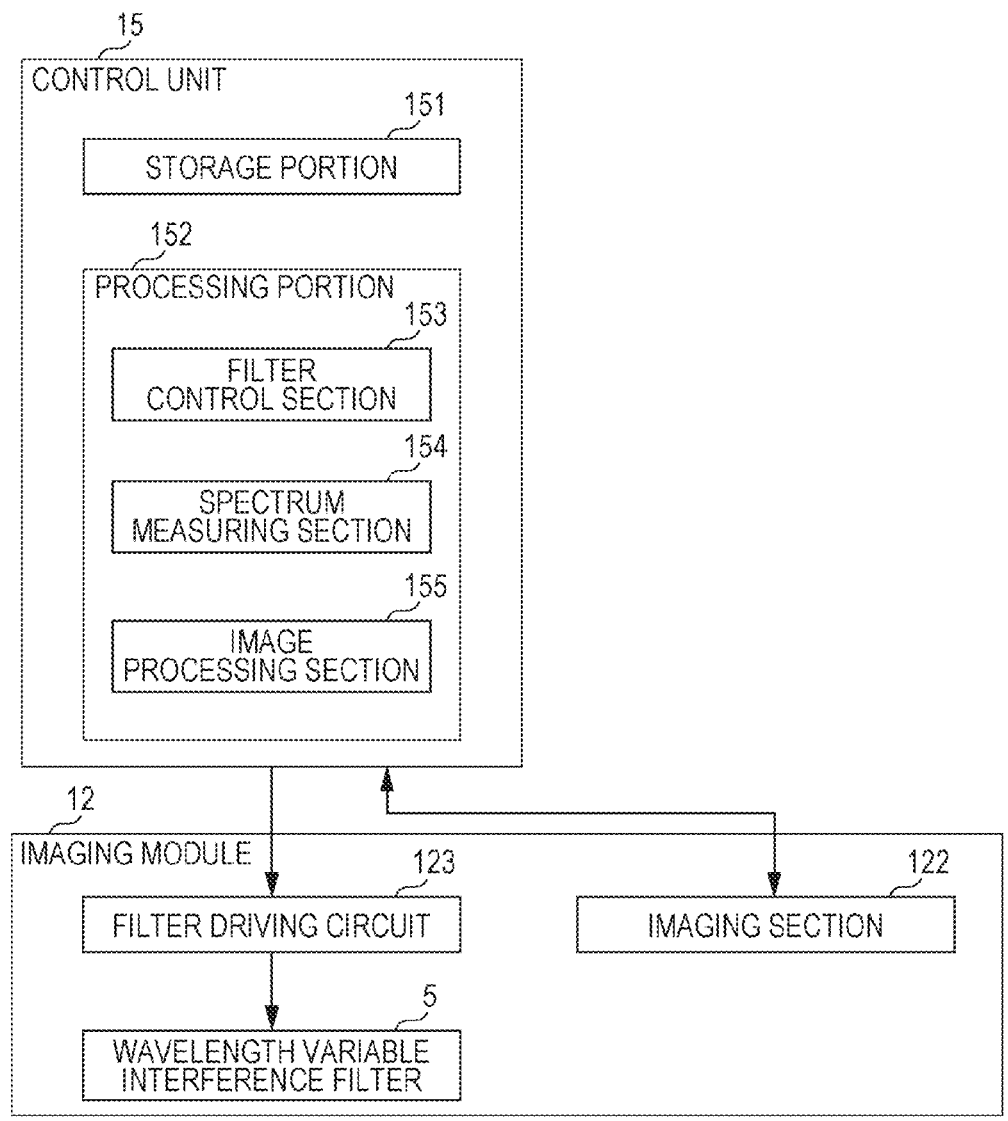
FIG. 4 is a block diagram illustrating a schematic configuration of a spectroscopic camera in the embodiment.

FIG. 4 is a block diagram illustrating a schematic configuration of a spectroscopic camera 1 in the embodiment.

The control unit 15 is formed by combining, for example, an operation circuit such as a CPU and a storage circuit such as a memory, and controls the entire operation of the spectroscopic camera 1. As illustrated in FIG. 4, the control unit 15 is provided with a storing unit 151, and a processing unit 152. A variety of items of data and programs for controlling the spectroscopic camera 1 are stored in the storing unit 151.

Examples of the variety of items of data stored in the storing unit 151 include light-received wavelength data, in which the wavelength of the light received in each of the imaging pixels 122A of the imaging unit 122 with respect to a voltage (a control amount) which is applied to the electrostatic actuator 56 in the wavelength variable interference filter 5 described below is stored.

An example of the light-received wavelength data according to the embodiment will be described in the following Table 1.

TABLE 1

| Control ID (n) | Control amount (V) | Pixel (1, 1) | Pixel a (nm) | Pixel b (nm) | Pixel c (nm) | Pixel (X, Y) |
|---|---|---|---|---|---|---|
| 1 | V1 | λ1 (1, 1) | 600 | 620 | 640 | λ1 (X, Y) |
| 2 | V2 | λ2 (1, 1) | 580 | 600 | 620 | λ2 (X, Y) |
| 3 | V3 | λ3 (1, 1) | 560 | 580 | 600 | λ3 (X, Y) |
| 4 | V4 | λ4 (1, 1) | 540 | 560 | 580 | λ4 (X, Y) |
| 5 | V5 | λ5 (1, 1) | 520 | 540 | 560 | λ5 (X, Y) |
| 6 | V6 | λ6 (1, 1) | 500 | 520 | 540 | λ6 (X, Y) |
| 7 | V7 | λ7 (1, 1) | 480 | 500 | 520 | λ7 (X, Y) |
| 8 | V8 | λ8 (1, 1) | 460 | 480 | 500 | λ8 (X, Y) |
| 9 | V9 | λ9 (1, 1) | 440 | 460 | 480 | λ9 (X, Y) |
| 10 | V10 | λ10 (1, 1) | 420 | 440 | 460 | λ10 (X, Y) |
| 11 | V11 | λ11 (1, 1) | 400 | 420 | 440 | λ11 (X, Y) |
| 12 | V12 | λ12 (1, 1) | 380 | 400 | 420 | λ12 (X, Y) |
| 13 | V13 | λ13 (1, 1) | 700 | 740 | 780 | λ13 (X, Y) |
| 14 | V14 | λ14 (1, 1) | 360 | 380 | 400 | λ14 (X, Y) |
| 15 | V15 | λ15 (1, 1) | 680 | 720 | 760 | λ15 (X, Y) |
| 16 | V16 | λ16 (1, 1) | 660 | 700 | 740 | λ16 (X, Y) |
| 17 | V17 | λ17 (1, 1) | 640 | 680 | 720 | λ17 (X, Y) |
| 18 | V18 | λ18 (1, 1) | 620 | 660 | 700 | λ18 (X, Y) |
| 19 | V19 | λ19 (1, 1) | 600 | 640 | 680 | λ19 (X, Y) |
| 20 | V20 | λ20 (1, 1) | 580 | 620 | 660 | λ20 (X, Y) |

A thick-bordered frame and a double frame in the imaging pixels a, b, and c in Table 1 as above indicate a target wavelength which is an acquisition target of the light amount in the acquisition target wavelength band (for example, in a range of 400 nm to 700 nm in the embodiment) of the spectroscopic image, and indicates an acquisition order when the light of the target wavelength is emitted from the wavelength variable interference filter 5. Specifically, the thick-bordered frame indicates of receiving the light of the second peak wavelength which is emitted from the wavelength variable interference filter 5, and the double frame indicates of receiving the light of the first peak wavelength which is emitted from the wavelength variable interference filter 5.

For example, the light which transmits through the wavelength variable interference filter is received as the second peak wavelength in the imaging pixel a by sequentially changing the control amounts (voltage values V1 to V11), and thus the target wavelength in a range of 400 nm to 600 nm at an interval of 20 nm is acquired. In addition, the light which transmits through the wavelength variable interference filter is received as the first peak wavelength in the imaging pixel a by sequentially changing the control amounts (voltage values V13, and V15 to V18), and thus the target wavelength in a range of 620 nm to 700 nm at the interval of 20 nm is acquired.

On the other hand, the target wavelength in a range of 400 nm to 620 nm at the interval of 20 nm which transmits through the wavelength variable interference filter 5 is acquired as the second peak wavelength in the imaging pixel b by sequentially changing the control amounts (voltage values V1 to V12) in. In addition, the target wavelength in a range of 640 nm to 700 nm at the interval of 20 nm which transmits through the wavelength variable interference filter is acquired as the first peak wavelength in the imaging pixel b by sequentially changing the control amounts (voltage values V16 to V19). In the same way, the light which transmits through the wavelength variable interference filter 5 is received as the second peak wavelength in the imaging pixel c by sequentially changing the control amounts (voltage values V1 to V12, and V14), and thus the target wavelength is acquired for every 20 nm in a range of 400 nm to 640 nm. In addition, the target wavelength is acquired for every 20 nm in a range of 660 nm to 700 nm which transmits through the wavelength variable interference filter is acquired the first peak wavelength in the imaging pixel c by sequentially changing the control amounts (voltage values V18 to V20).

That is, in the imaging pixel a, the light in a range of 620 nm and 640 nm is detected by the light of the first peak wavelength which transmits through the wavelength variable interference filter 5. In contrast, in the imaging pixel b, the light of 620 nm is detected by the light of the second peak wavelength which transmits through the wavelength variable interference filter 5, and the light of 640 nm is detected by the light of the first peak wavelength which transmits through the wavelength variable interference filter 5. In addition, in the imaging pixel c, the light in a range of 620 nm and 640 nm is detected by the light of the second peak wavelength which transmits through the wavelength variable interference filter 5. In this way, in the embodiment, among the light beams transmitting through the wavelength variable interference filter 5, the order of acquiring the target wavelength is set with respect to each of the imaging pixels 122A.

Note that, in the embodiment, the driving voltage which is applied to the electrostatic actuator 56 is described as an example of the control amount, but the size of the gap between the reflection films 54 and 55 may be recorded, for example.

In addition, examples of the variety of programs stored in the storing unit 151 include a spectroscopic imaging program and an optical spectrum measuring program. When using a smart phone, a tablet terminal, or the like which is capable of communicating with a server device via network, as the spectroscopic camera 1, it is possible to download and acquire the programs from the server device.

The processing unit 152 functions as a filter control unit 153, a spectrum measuring unit 154, and an image processing unit 155 by reading and executing the variety of programs which are stored in the storing unit 151, as illustrated in FIG. 4.

Note that, in the embodiment, the processing unit 152 reads and executes the programs (software) which are stored in the storing unit 151, and thus the respective functions are realized by cooperation of hardware with software; however, the embodiment is not limited to this configuration. For example, a configuration in which a circuit as a hardware having the respective functions is provided may be adopted.

The filter control unit 153 sequentially changing the voltage applied to the electrostatic actuator 56 in the wavelength variable interference filter 5 by referring to light-received wavelength data which is stored in the storing unit 151.

The spectrum measuring unit 154 acquires the amount of light received in each of the imaging pixels 122A, and then measures an optical spectrum in each pixel of (an image pixel) of the captured image.

The image processing unit 155 generates a spectroscopic image of a desired objective wavelength.

A detailed description of each of function configuration will be described blow.

Spectroscopic Image Acquiring Method by Using Spectroscopic Camera

Process of Acquiring Spectroscopic Image

Next, a method of acquiring the spectroscopic image by using the spectroscopic camera 1 in the embodiment will be described.

Figure 5:
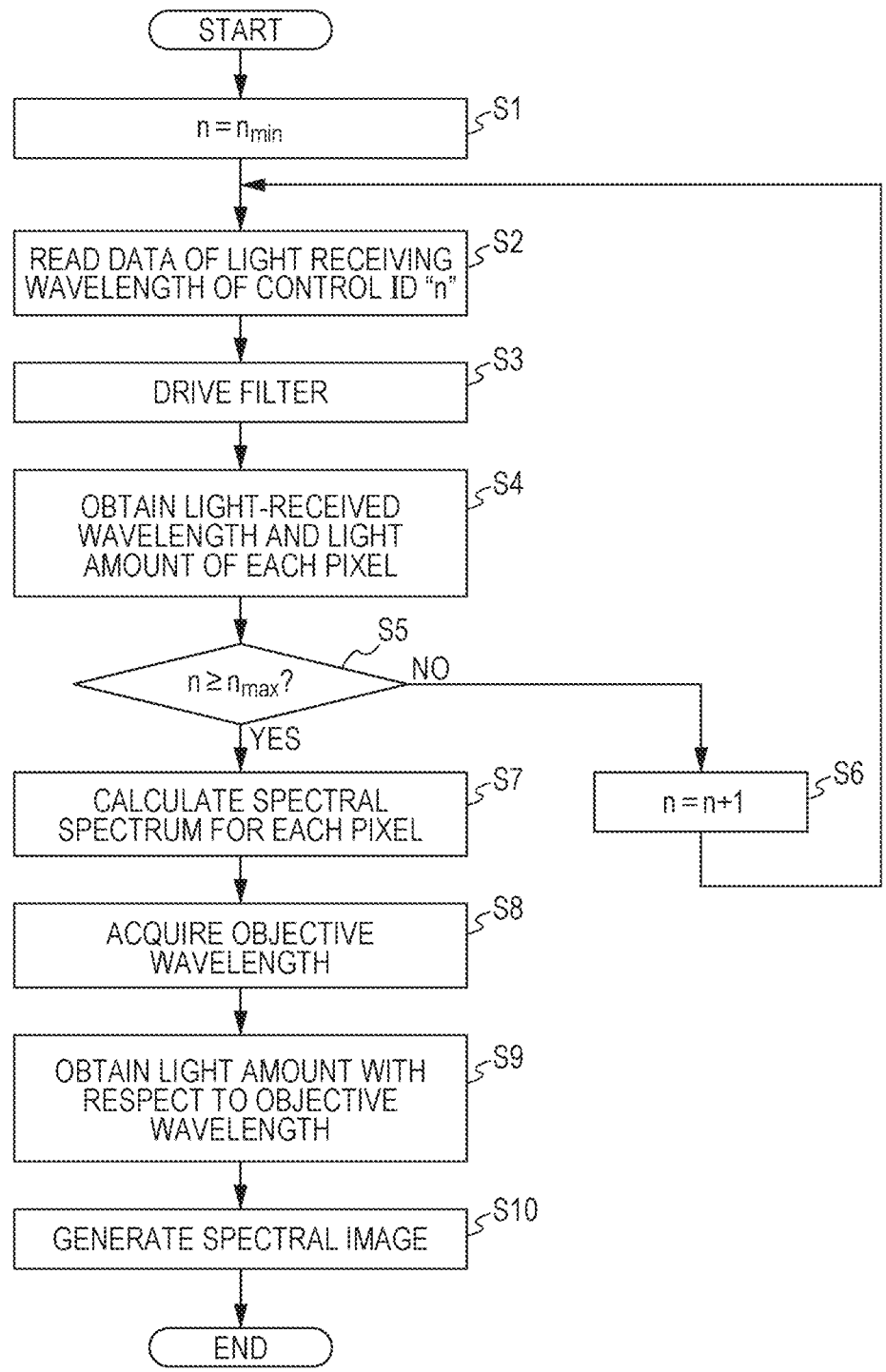
FIG. 5 is a flowchart illustrating a spectroscopic image acquiring method by using the spectroscopic camera in the embodiment.

FIG. 5 is a flowchart illustrating the process of capturing the spectroscopic image in the embodiment.

In the process of acquiring the spectroscopic image in the embodiment, the wavelength having a predetermined interval (an interval of 20 nm, in the embodiment) with respect to the acquisition target wavelength band in a range of the wavelength $\lambda_{Min}$ (400 nm, in the embodiment) to the wavelength $\lambda_{Max}$ (700 nm, in the embodiment) is set as a target wavelength, and then the spectroscopic image with respect to the target wavelength is acquired.

For this reason, the control unit 15, firstly, initializes a control variable n, and sets a relationship expressed by $n=n_{min}$ ($n_{min}=1$ in a case of Table 1) (step S1).

Next, the filter control unit 153 reads data of which the control ID (refer to Table 1) is "n" by referring to light-received wavelength data which is stored in the storing unit 151 (step S2). For example, in an example in Table 1 described above, the filter control unit 153 reads data (control data) of which the control amount (the driving voltage which is applied to the electrostatic actuator 56 in the wavelength variable interference filter 5) is V1 (V).

Then, the filter control unit 153 controls the filter driving circuit 123, and applies the control amount (the driving voltage) of the read control data to the electrostatic actuator 56. That is, the filter control unit 153 drives the wavelength variable interference filter 5 (step S3).

With this, the light in accordance with the size of the gap G1 between the reflection films 54 and 55 is received in each of the imaging pixels 122A of the imaging unit 122, and a signal value in accordance with the light receiving amount is output from each of the imaging pixels 122A.

The spectrum measuring unit 154 detects the amount of light received in each of the imaging pixels 122A from the signal value output from each of the imaging pixels 122A, and stores the detected light amount and the wavelength of light received in each of the imaging pixels 122A in the light-received wavelength data which is read in step S2 in the storing unit 151 (step S4).

Thereafter, the filter control unit 153 determines whether or not the control variable n is $n_{max}$ ($n_{max}=18$ in a case of Table 1) or higher (step S5). In step S5, when it is determined "No", for example, "1" is added to the control variable n (step S6), and the process returns to step S2. That is, until the light amount with respect to the entire target wavelength is acquired in each of the imaging pixels 122A, the above-described processes from step S2 to step S6 are repeatedly performed.

Here, the light received in the imaging unit 122 through step S1 to step S5 will be described in the following description.

Figure 6:
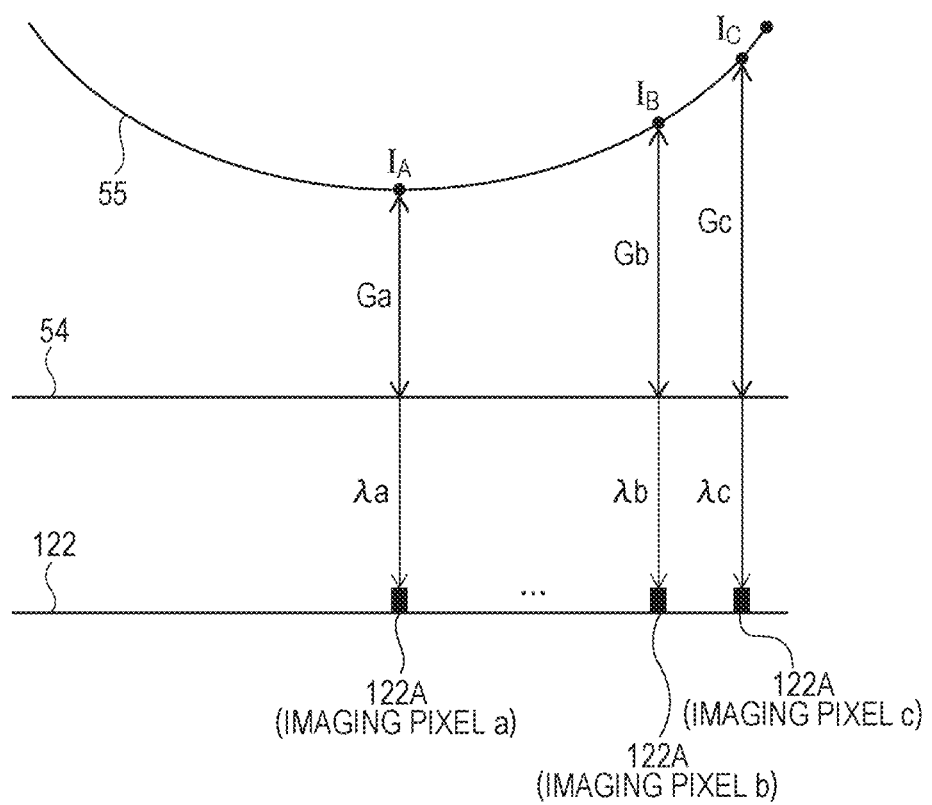
FIG. 6 is a diagram illustrating a relationship of a size of a gap between the reflection films and the wavelength of light received in an imaging unit in the embodiment.

FIG. 6 is a diagram illustrating a relationship of a size of a gap between the reflection films 54 and 55 of the wavelength variable interference filter 5 and the wavelength of light received in an imaging unit 122 in the embodiment.

Figure 7:
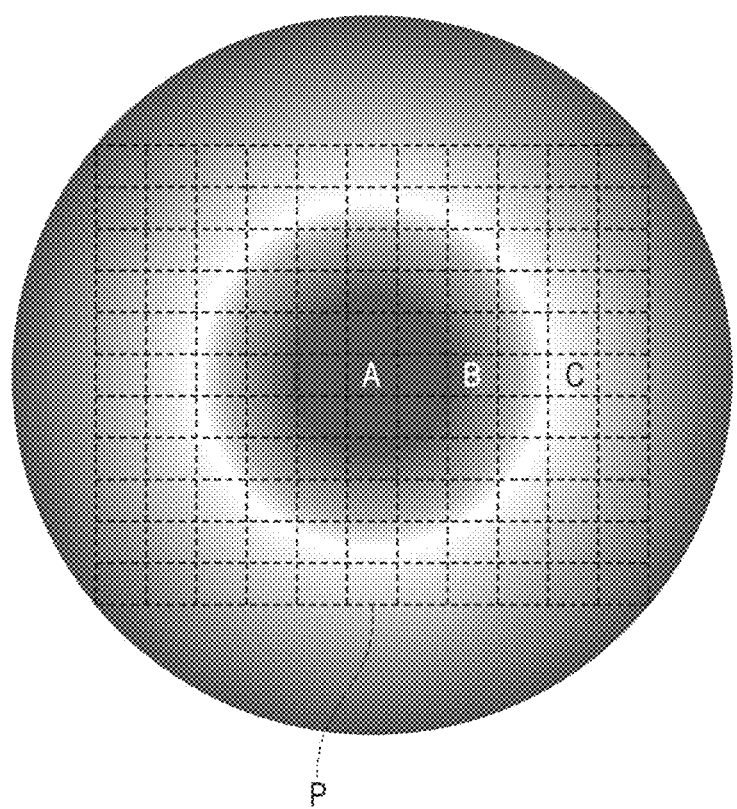
FIG. 7 is a diagram illustrating wavelength distribution of light which transmits through the wavelength variable interference filter and an image range of a captured image in the embodiment.

FIG. 7 is a diagram illustrating wavelength distribution of light which transmits through the wavelength variable interference filter 5 and an image range of an image captured by the imaging unit 122.

In the wavelength variable interference filter 5, due to the deflection at the time of displacing the movable portion 521 to the fixation substrate 51 side, and variations in the thickness of the substrates 51 and 52 and the reflection films 54 and 55 in the manufacturing, the variation of the size of the gap between the reflection films 54 and 55 occurs as illustrated in FIG. 6.

For this reason, the wavelength of the light which transmits through the wavelength variable interference filter 5 is different depending on the light-incident position on the wavelength variable interference filter 5. For example, in FIG. 6, the light which is incident on light-incident positions IA, IB, and IC of the wavelength variable interference filter 5 (reflection film 55) is multiply interfered by gap sizes Ga, Gb, and Gc between the reflection films 54 and 55, and thereby the light having the wavelengths λa, λb, and λc is transmitted and received in the imaging pixels a, b, and c.

As described above, the variation also occurs in the wavelength of the light which transmits through the wavelength variable interference filter 5, and the wavelength distribution appears as illustrated in FIG. 7. Meanwhile, in FIG. 7, the wavelength distribution of the light which transmits through the wavelength variable interference filter 5 is indicated by shading, and an area indicated by the dashed line is an imaging area captured by the imaging unit 122, which correspond to a captured image P. In addition, each of the dashed line squares in the captured image P corresponds to each pixel (the image pixel) in the captured image P corresponding to each of the imaging pixels 122A. The imaging pixels a, b, and c in FIG. 6 respectively correspond to image pixels A, B, and C.

In addition, in the embodiment, as shown in Table 1, with respect to each of the control amounts (the driving voltage applied to the electrostatic actuator 56) of the wavelength variable interference filter 5, the wavelength (the target wavelength) of the light received in each of the imaging pixels 122A is stored in the light-received wavelength data. For this reason, in step S4, it is possible to detect both the wavelength of the light received in each of the imaging pixels 122A, and the light amount thereof with high precision.

In Table 2 below, the gap sizes Ga, Gb, and Gc corresponding to light-incident positions $I_A$, $I_B$, and $I_C$, and wavelengths λa, λb, and λc of the light received in the imaging pixels a, b, and c in the number of times of measurement in the embodiment are indicated.

TABLE 2

| The number of times | Gap size (nm) | | | Light-received wavelength (nm) | | |
|---|---|---|---|---|---|---|
| measurement (n) | Ga | Gb | Gc | Pixel a | Pixel b | Pixel c |
| 1 | 526 | 548 | 569 | 600 | 620 | 640 |
| 2 | 504 | 526 | 547 | 580 | 600 | 620 |
| 3 | 483 | 505 | 526 | 560 | 580 | 600 |
| 4 | 461 | 483 | 504 | 540 | 560 | 580 |
| 5 | 440 | 462 | 483 | 520 | 540 | 560 |
| 6 | 418 | 440 | 461 | 500 | 520 | 540 |
| 7 | 396 | 418 | 439 | 480 | 500 | 520 |
| 8 | 375 | 397 | 418 | 460 | 480 | 500 |
| 9 | 353 | 375 | 396 | 440 | 460 | 480 |
| 10 | 332 | 354 | 375 | 420 | 440 | 460 |
| 11 | 310 | 332 | 353 | 400 | 420 | 440 |
| 12 | 288 | 310 | 331 | 380 | 400 | 420 |
| 13 | 277 | 299 | 320 | 700 | 740 | 780 |
| 14 | 267 | 289 | 310 | 360 | 380 | 400 |
| 15 | 266 | 288 | 309 | 680 | 720 | 760 |
| 16 | 256 | 278 | 299 | 660 | 700 | 740 |
| 17 | 245 | 267 | 288 | 640 | 680 | 720 |
| 18 | 235 | 257 | 278 | 620 | 660 | 700 |
| 19 | 224 | 246 | 267 | 600 | 640 | 680 |
| 20 | 214 | 236 | 257 | 580 | 620 | 660 |

In addition, Table 3 indicates the gap sizes Ga, Gb, and Gc corresponding to the light-incident positions $I_A$, $I_B$, and $I_C$ and the wavelengths λa, λb, and λc of the light received in the imaging pixels a, b, and c in the number of times of measurement in a case where the acquisition order with respect to each target wavelength in the related art is determined.

TABLE 3

| The number of times measurement | Gap size (nm) | | | Light-received wavelength (nm) | | |
|---|---|---|---|---|---|---|
| (n) | Ga | Gb | Gc | Pixel a | Pixel b | Pixel c |
| 1 | 526 | 548 | 569 | 600 | 620 | 640 |
| 2 | 504 | 526 | 547 | 580 | 600 | 620 |
| 3 | 483 | 505 | 526 | 560 | 580 | 600 |
| 4 | 461 | 483 | 504 | 540 | 560 | 580 |
| 5 | 440 | 462 | 483 | 520 | 540 | 560 |
| 6 | 418 | 440 | 461 | 500 | 520 | 540 |
| 7 | 396 | 418 | 439 | 480 | 500 | 520 |
| 8 | 375 | 397 | 418 | 460 | 480 | 500 |
| 9 | 353 | 375 | 396 | 440 | 460 | 480 |
| 10 | 332 | 354 | 375 | 420 | 440 | 460 |
| 11 | 310 | 332 | 353 | 400 | 420 | 440 |
| 12 | 288 | 310 | 331 | 380 | 400 | 420 |
| 13 | 277 | 299 | 320 | 700 | 740 | 780 |
| 14 | 267 | 289 | 310 | 360 | 380 | 400 |
| 15 | 266 | 288 | 309 | 680 | 720 | 760 |
| 16 | 256 | 278 | 299 | 660 | 700 | 740 |
| 17 | 245 | 267 | 288 | 640 | 680 | 720 |
| 18 | 235 | 257 | 278 | 620 | 660 | 700 |
| 19 | 224 | 246 | 267 | 600 | 640 | 680 |
| 20 | 214 | 236 | 257 | 580 | 620 | 660 |
| 21 | 203 | 225 | 246 | 560 | 600 | 640 |
| 22 | 193 | 215 | 236 | 540 | 580 | 620 |
| 23 | 182 | 204 | 225 | 520 | 560 | 600 |

In the embodiment, as shown in Table 2, in a case where the number of times of measurement n with respect to the imaging pixel a is in a range of 1 to 11, the light which transmits through the wavelength variable interference filter 5 as the second peak wavelength in a range of 600 nm to 400 nm at the interval of 20 nm is received. Here, the light of the first peak wavelength which is incident on the imaging pixel a becomes the wavelength which is longer than 700 nm, and is shielded by the band pass filter.

In addition, when the number of times of measurement n is 12 and 14, the light receiving amount of the imaging pixel a is out of the acquisition target wavelength band, and is the light which is shielded by the band pass filter, and thereby the acquisition of light amount is not performed.

On the other hand, in a case where the number of times of measurement n is in 13, 15 to 18, the light which transmits through the wavelength variable interference filter 5 as the first peak wavelength in a range of 700 nm to 620 nm at the interval of 20 nm is received. At this time, the light of the second peak wavelength which is incident on the imaging pixel a becomes the wavelength which is shorter than 400 nm, and is shielded by the band pass filter. For example, in a case where the number of times of measurement n is 13, the light which is about 370 nm can transmit through the wavelength variable interference filter 5 as the second peak wavelength, but is shielded by the band pass filter. For this reason, in the imaging pixel a, it is possible to detect the light having 700 nm of the first peak wavelength with high precision. In addition, in a case where the number of times of measurement n is 14, the light which is about 681 nm can transmit through the wavelength variable interference filter 5 as the first peak wavelength; however, a signal value is not acquired from the imaging pixel a at this time of measurement.

The same is true for other pixels, the light of the wavelength band in a range of 620 nm to 400 nm in the imaging pixel b, and the light of the wavelength band in a range of 640 nm to 400 nm in the imaging pixel c are detected by receiving the light of the second peak wavelength which transmits through the wavelength variable interference filter 5. In addition, the light of the wavelength band in a range of 700 nm to 640 nm in the imaging pixel b, and the light of the wavelength band in a range of 700 nm to 660 nm in the imaging pixel c are detected by receiving the light of the first peak wavelength which transmits through the wavelength variable interference filter 5.

In addition, as described above, in the embodiment, the control ID of the light-received wavelength data is set to be "n" in such a manner that the size of the gap between the reflection films 54 and 55 becomes smaller compared to the initial gap size (for example, Ga is 580 nm, Gb is 600 nm, and Gc is 620 nm), and the wavelength variable interference filter 5 is driven in order of the control IDs. For this reason, it is possible to decrease a driving amount of the movable portion 521, thereby suppressing vibration residual by spring properties of the movable substrate 52.

On the other hand, as shown in Table 3, in a case where the acquisition order with respect to the target wavelength is determined as a specific order, the number of times of measurement is increased. That is, as shown in Table 3, in the related method, it is necessary to perform 23 times of measurements for receiving the light of the target wavelength having the interval of 20 nm with respect to the acquisition target wavelength band in a range of 400 nm to 700 nm in each of the imaging pixels.

In contrast, in the embodiment, 20 times of measurement is enough for making the rapid measurement process possible.

Returning to FIG. 5, in step S5, when it is determined "Yes", the spectrum measuring unit 154 measures (calculates) the optical spectrum of the light received in each of the imaging pixels 122A based on the light amount of each target wavelength received in each of the imaging pixels 122A (step S7).

In step S7, the spectrum measuring unit 154 measures the optical spectrum in each pixel based on the light receiving amount (the light amount of each image pixel in the captured image) in each of the imaging pixels 122A and the wavelength of the light received when sequentially changing the size of the gap G1 between the reflection films 54 and 55.

Next, the image processing unit 155 acquires the objective wavelength which corresponds to a generation target of the spectroscopic image (step S8). In acquisition of the objective wavelength, for example, the image processing unit 155 may acquire the objective wavelength through the operation of the operating unit 14 by the user, and the objective wavelength may be set in advance. The number of the objective wavelengths is not particularly limited.

Further, the image processing unit 155 acquires the light amount with respect to the objective wavelength which is set by the optical spectrum in each image pixel (step S9), and generates the spectroscopic image in which the light amount is set to be a pixel value (step S10).

With such a configuration, the spectroscopic image of the objective wavelength is generated.

Effects of First Embodiment

In the spectroscopic camera 1 in the embodiment, the filter control unit 153 controls the electrostatic actuator 56 in the wavelength variable interference filter 5 based on light-received wavelength data stored in the storing unit 151. Here, in the embodiment, the light-received wavelength data includes the driving voltage which is the control amount of the electrostatic actuator 56, the wavelength of (the target wavelength) the light received in each of the imaging pixels 122A of the imaging unit 122 at the time of applying the driving voltage to the electrostatic actuator 56, and the emission order (the acquisition order) of the target wavelength from the wavelength variable interference filter. In addition, the acquisition order is obtained by sequentially setting the acquirable target wavelength in each of the imaging pixels 122A when the control amount is gradually increased with respect to acquisition target wavelength band, and as shown in Table 1, the control amount is indicated in the table in an ascending order.

In the spectroscopic camera 1 of the embodiment by using the light-received wavelength data having the aforementioned configuration, for example, as shown in Table 3, it is possible to decrease the number of times of measurement compared with a case where the order for detecting a certain target wavelength is determined to be one, thereby realizing a rapid measurement process.

In addition, as the control amount is gradually increased from the initial value, an amount of displacement of the movable portion 521 of the wavelength variable interference filter 5 is decreased, for example, even in a case where the movable portion 521 vibrated due to spring properties of the movable substrate 52, the vibration amplitudes is small and thus the measuring time per one measurement is also decreased.

Such a configuration, in the embodiment, in each of the imaging pixels 122A it is possible to decrease the measurement time for acquiring each target wavelength, and realize the rapid measurement process of the spectroscopic image.

Further, in the embodiment, the wavelength of the light received in each of the imaging pixels 122A is stored in the light-received wavelength data at the time of controlling the electrostatic actuator 56 with a predetermined control amount. Therefore, for example, unlike the related art, it is possible to specify the wavelength which is indicated by the light amount of each image pixel, thereby acquiring the highly precise spectroscopic image instead of an image which is assumed that a value of the light amount of each image pixel in the captured image is for one target wavelength.

In the embodiment, light other than the light in the acquisition target wavelength band is shielded so as not to be incident on the imaging unit 122 by the band pass filter.

For this reason, it is possible to prevent light other than the light of the wavelength of the acquisition order which is emitted from the wavelength variable interference filter 5 from being incident on the imaging unit 122, and to acquire the highly precise spectroscopic image.

In addition, in the embodiment, the optical spectrum in each of the image pixels is calculated in step S7 of the process of acquiring the spectroscopic image. Accordingly, for example, even in a case where the spectroscopic image of the objective wavelength other than the target wavelength (for example, 650 nm or the like) is to be acquired, it is possible to acquire the light amount of the objective wavelength in each of the image pixels from the calculated optical spectrum with high precision, and thus to generate the spectroscopic image of the objective wavelength.

Further, in the embodiment, as the light-received wavelength data, in each of the imaging pixels 122A, the control amount for receiving the target wavelength which has a certain interval (for example, an interval of 20 nm) in the acquisition target wavelength band (for example, 400 nm to 700 nm) is set.

spectroscopic camera 1 is set as the wavelength having the interval of 20 nm in a range of the acquisition target wavelength band (for example, 400 nm to 700 nm), and the light-received wavelength data which sets the control amount capable of acquiring the target wavelength in each of the imaging pixels 122A is used.

In contrast, a second embodiment is different from the first embodiment from an aspect that the target wavelength is independently set in each of the imaging pixels 122A.

In other words, in the first embodiment, the target wavelength is the wavelength having the interval of 20 nm in a range of 400 nm to 700 nm, for example, and each of the control amounts is set such that the light of the target wavelength can be received in each of the imaging pixels 122A. However, actually, it is very unlikely that the variation of the size of the gap between the reflection films 54 and 55 of the wavelength variable interference filter 5 is a constant value. Accordingly, even though the control amount V1 is set so as to receive the target wavelength of 600 nm in the imaging pixel a, it is unlikely that the target wavelength of 620 nm is received in the imaging pixel b, and it is difficult to form the wavelength variable interference filter 5 having properties as shown in Table 1.

In contrast, in the second embodiment, the light-received wavelength data is set as shown in Table 4 below.

TABLE 4

| Control ID (n) | Control amount (V) | Imaging pixel | | | |
|---|---|---|---|---|---|
| | | Pixel (1, 1) | Pixel a (nm) | Pixel b (nm) | Pixel c (nm) | Pixel (X, Y) |
| 1 | V1 | λ1 (1, 1) | 600 | 619 | 637 | λ1 (X, Y) |
| 2 | V2 | λ2 (1, 1) | 580 | 599 | 617 | λ2 (X, Y) |
| 3 | V3 | λ3 (1, 1) | 560 | 579 | 597 | λ3 (X, Y) |
| 4 | V4 | λ4 (1, 1) | 540 | 559 | 577 | λ4 (X, Y) |
| 5 | V5 | λ5 (1, 1) | 520 | 539 | 557 | λ5 (X, Y) |
| 6 | V6 | λ6 (1, 1) | 500 | 519 | 537 | λ6 (X, Y) |
| 7 | V7 | λ7 (1, 1) | 480 | 499 | 517 | λ7 (X, Y) |
| 8 | V8 | λ8 (1, 1) | 460 | 479 | 497 | λ8 (X, Y) |
| 9 | V9 | λ9 (1, 1) | 440 | 459 | 477 | λ9 (X, Y) |
| 10 | V10 | λ10 (1, 1) | 420 | 439 | 457 | λ10 (X, Y) |
| 11 | V11 | λ11 (1, 1) | 400 | 419 | 437 | λ11 (X, Y) |
| 12 | V12 | λ12 (1, 1) | 380 | 399 | 417 | λ12 (X, Y) |
| 13 | V13 | λ13 (1, 1) | 700 | 738 | 776 | λ13 (X, Y) |
| 14 | V14 | λ14 (1, 1) | 360 | 379 | 397 | λ14 (X, Y) |
| 15 | V15 | λ15 (1, 1) | 680 | 718 | 756 | λ15 (X, Y) |
| 16 | V16 | λ16 (1, 1) | 660 | 698 | 736 | λ16 (X, Y) |
| 17 | V17 | λ17 (1, 1) | 640 | 678 | 716 | λ17 (X, Y) |
| 18 | V18 | λ18 (1, 1) | 620 | 658 | 696 | λ18 (X, Y) |
| 19 | V19 | λ19 (1, 1) | 600 | 638 | 676 | λ19 (X, Y) |
| 20 | V20 | λ20 (1, 1) | 580 | 618 | 656 | λ20 (X, Y) |

Therefore, when the objective wavelength is the target wavelength, the filter control unit 153 reads the control amount (the driving voltage) with respect to the target wavelength, and sequentially applies the driving voltage to the electrostatic actuator 56, and thereby it is possible to detect the value of the light amount with respect to the objective wavelength of each of the image pixels. That is, it is possible to generate the spectroscopic image without calculating the optical spectrum.

Second Embodiment

Next, the second embodiment according to the invention will be described.

In the first embodiment described above, as shown in Table 1 and Table 2, the target wavelength acquired by the In the embodiment, as shown in Table 4, the wavelengths having a certain interval (for example, 20 nm) are set with respect to the imaging pixel a (the imaging pixel 122A which is disposed at the center position in the imaging unit 122), and among them, the acquisition target wavelength band (for example, 400 nm to 700 nm) is set as the target wavelength. Then, the control amount is set as a value capable of acquiring the target wavelength in the imaging pixel a based on the imaging pixel a.

On the other hand, in other imaging pixels 122A, when the control amount (the driving voltage) for receiving the light of the wavelength having a certain interval in the imaging pixel a is applied to the electrostatic actuator 56, the wavelength of the light actually received is set as each of the target wavelengths. That is, the target wavelengths in the imaging pixels b and c may be different the wavelengths from the target wavelength in the imaging pixel a. In the embodiment, the target wavelength is independently set with respect to each of the imaging pixels 122A.

Note that, the spectroscopic image acquiring method is the same in the first embodiment described above (refer to FIG. 6).

In the embodiment, each of the target wavelengths is set with respect to each of the imaging pixels 122A. Specifically, in the embodiment, the wavelength group having a certain interval which includes a specific target wavelength is set with respect to a center pixel a in the imaging unit 122, each of the control amounts is set such that the light of the wavelength group is received in the imaging pixel a and when the electrostatic actuator 56 is controlled by each of the control amount, the wavelength corresponding to the acquisition target wavelength band among the wavelengths of the light received in other imaging pixels 122A is set as the target wavelength.

In this way, by using the light-received wavelength data, it is possible to decrease the number of times of measurement compared with a case where the wavelength corresponding to a certain interval in the acquisition target wavelength band is set as the target wavelength. That is, in a case where each control amount is set such that the light of the specific target wavelength is received in each of the imaging pixels 122A, the number of times of measurement may be increased depending on the variation of the size of the gap between the reflection films 54 and 55 of the wavelength variable interference filter 5. In contrast, in the embodiment, the target wavelength is set with respect to each of the imaging pixels 122A, and thus it is possible to more decrease the number of times of measurement. Therefore, it is possible to realize the more rapid process even in a process of acquiring the spectroscopic image.

In addition, even in a case of using such light-received wavelength data, as indicated in step S7 in FIG. 5, it is possible to calculate the light amount with respect to a desired objective wavelength with high precision by calculating the optical spectrum in each of the image pixels of the captured image, thereby generating the highly precise spectroscopic image.

Third Embodiment

Next, the third embodiment according to the invention will be described.

In the first embodiment and the second embodiment described above, the light-received wavelength data in which each of the target wavelengths and the acquisition order thereof are set with respect to each of the imaging pixels 122A is used. However, the third embodiment is different from the above-described embodiments from an aspect that a plurality of the imaging pixels 122A are set as a pixel group, the imaging unit 122 is divided into the plurality of pixel groups, and then the same target wavelength and the acquisition order thereof is set with respect to each of the imaging pixels which belongs to each pixel group.

Figure 8:
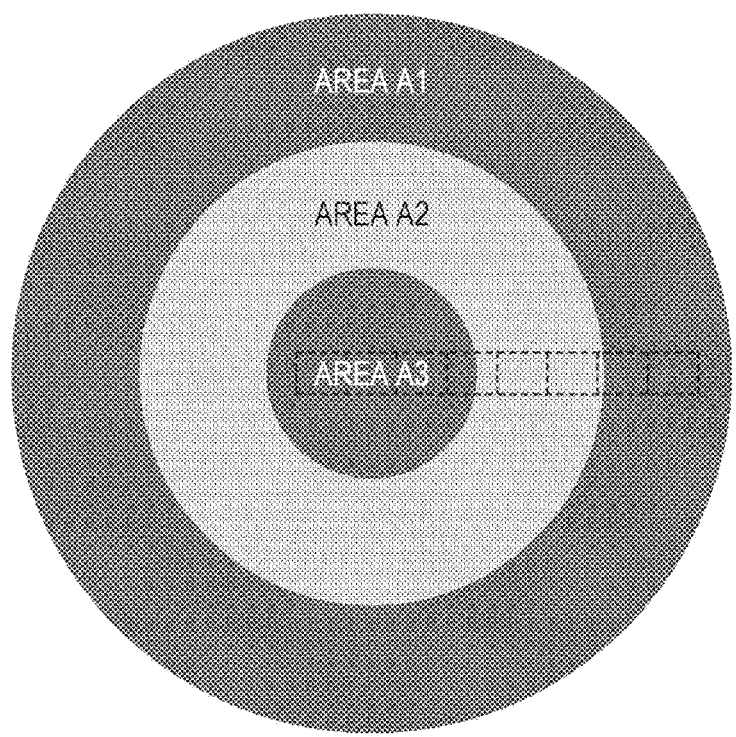
FIG. 8 is a diagram illustrating an area in which light which transmits through the wavelength variable interference filter is divided in accordance with the wavelength in a third embodiment.

FIG. 8 is a diagram illustrating and example of an area in which the light which transmits through the wavelength variable interference filter 5 is divided in accordance with the wavelength in the third embodiment.

In the embodiment, as illustrated in FIG. 8, an area is divided into a plurality of areas in accordance with the wavelength of the light which transmits through the wavelength variable interference filter 5. That is, due to the variation the size of the gap between the reflection films 54 and 55, each of the imaging pixels 122A of the imaging unit 122 is divided into a plurality of pixel groups (areas).

These areas are set by a wavelength resolution of the wavelength variable interference filter. The wavelength resolution is an interval of the light which is emitted from the wavelength variable interference filter 5, for example, in a case where the target wavelength which is received in the imaging pixel a is changed at an interval of 20 nm, the wavelength resolution becomes 20 nm.

It is preferable that a half value of the wavelength resolution is set as a unit in each area. For example, in a case where the wavelength resolution is 20 nm, the gap size Ga corresponding to the imaging pixel 122A (the imaging pixel a) which is disposed at the center position of the imaging unit 122 is set as a reference gap size, and the imaging pixel 122A is divided into a plurality of pixel groups (areas) based on a difference between the gap size corresponding to each of the imaging pixels 122A and the reference gap size (the variation of the gap size). Specifically, the imaging pixel 122A is divided into an area (an area A3 in FIG. 8) in which the variation of the gap size is less than 10 nm, an area (an area A2 in FIG. 8) in which the variation of the gap size is equal to or greater than 10 nm and less than 20 nm, and an area (an area A1 in FIG. 8) in which the variation of the gap size is equal to or greater than 20 nm and less than 30 nm. The same is true for the following range.

As described above, in a case where an area is divided into a plurality of areas by setting the half value of the wavelength resolution as a unit, it is preferable to set the target wavelength for each three units.

For example, at the time of applying a predetermined driving voltage V to the electrostatic actuator 56, when the wavelength of the light received in each of the imaging pixels 122A which belongs to the area A1 is approximately 630 nm, the wavelength of the light received in each of the imaging pixels 122A which belongs to the area A2 is approximately 620 nm, and the wavelength of light received in each of the imaging pixels 122A which belongs to the area A3 is approximately 610 nm, the target wavelengths of these areas A1, A2, and A3 are set to be 620 nm. That is, at the time of applying the driving voltage V to the electrostatic actuator 56, the spectrum measuring unit 154 processes assuming that the light having the target wavelength 620 nm is received in these areas A1, A2, and A3. An error is generated in a range of less than 10 nm between the actual received light wavelength and the target wavelength, but the value of the error is smaller than the half value of the wavelength resolution, and thus it is possible to suppress the effect on the measuring accuracy. In addition, in each of the imaging pixels 122A which belongs to the areas A1, A2, and A3, the variation of the light-received wavelength which is less than 20 nm occurs, but the value of the variation is smaller than that of the wavelength resolution, and thus it is possible to suppress the effect on the measuring accuracy.

Note that, in the above-described examples, in accordance with the variation the size of the gap between the reflection films 54 and 55 corresponding to each of the imaging pixels 122A of the imaging unit 122, the imaging pixel 122A is divided into a plurality of areas by setting the half value of the wavelength resolution as a unit, and the target wavelength is set in each area for each three units; however, the invention is not limited thereto.

For example, in accordance with the variation the size of the gap between the reflection films 54 and 55 corresponding to each of the imaging pixels 122A of the imaging unit 122, the imaging pixel 122A may be divided into a plurality of areas by setting the half value of the wavelength resolution as a unit, and the target wavelengths which are different from each other may be set in each area.

In addition, in an example of FIG. 8, due to the deflection by the displacement of the movable portion 521, the variation of the gap size occurs from the center position of the movable portion 521 to a radial direction, and thus the area is divided in accordance with the distance from the imaging pixel 122A (the imaging pixel a) of the center position of the imaging unit 122; however, the embodiment is not limited to this example. The variation of the gap size may occur due to small thickness variation at the time of the manufacturing, for example. In this case, for example, the area A1 may be included in a portion of the area A2.

In the embodiment, the imaging unit 122 is divided into the plurality of areas (the pixel group) based on the variation of the size of the gap between the reflection films 54 and 55 on the optical path of the light received in each of the imaging pixels 122A. Then, with respect to each area, the light-received wavelength data stores each of the target wavelengths and the control amount (the driving voltage) of the electrostatic actuator 56 at the time of receiving the light of the target wavelength.

The light having substantially the same wavelength is received in each of the imaging pixels 122A which is included in each area. Particularly, as described above, in a case of dividing an area by setting the value which is less than wavelength resolution as a unit, even when the variation of the light-received wavelength occurs, there is no adverse effect on the measuring accuracy. The number of setting times of the target wavelength and the acquisition order is decreased by setting the target wavelength and the acquisition order thereof with respect to each area compared with a case of setting the target wavelength and the acquisition order thereof with respect to the entire imaging pixel 122A, for example. Accordingly, it is possible to simplify a configuration of the light-received wavelength data, and to decrease the driving amount of the electrostatic actuator 56 or the number of times of measurement by the filter control unit 153, thereby realizing more rapid process.

Fourth Embodiment

Next, the fourth embodiment according to the invention will be described.

In the third embodiment, a pixel group including the imaging pixel 122A which corresponds to the gap size having the same degree of variation is set in accordance with the variation of the size of the gap between the reflection films 54 and 55. In contrast, the fourth embodiment is different from the third embodiment from an aspect that in the imaging unit 122, a plurality of imaging pixels 122A which are close to each other are set as a pixel group.

FIG. 9 is a diagram illustrating wavelength distribution of the light which transmits through the wavelength variable interference filter, an image range of a captured image, and a synthesized image generated in the fourth embodiment.

As illustrated in FIG. 9, in the embodiment, 2×2 pixels which are close to each other in the imaging pixel 122A (the imaging pixels a, b, c, and d in FIG. 9) are set as one pixel group. Here, at the time of applying a predetermined driving voltage V to the electrostatic actuator 56 in the wavelength variable interference filter 5, an example of the wavelength of the light received in each of the imaging pixels a, b, c, and d is indicated in the following Table 5.

TABLE 5

| Imaging pixel | Light-received wavelength |
| --- | --- |
| A | 660 |
| B | 662 |
| C | 659 |
| D | 663 |

On the other hand, in the light-received wavelength data, an average value (661 nm in an example of Table 5) of the light-received wavelength with respect to the pixel group of these imaging pixels a, b, c, and d is set as the target wavelength.

That is, the target wavelength of 661 nm in a control amount V with respect to the imaging pixels a, b, c, and d is recorded in the light-received wavelength data. For this reason, at the time of applying the driving voltage V to the electrostatic actuator 56, the spectrum measuring unit 154 processes assuming that the light having the wavelength 661 nm is received in the imaging pixels a, b, c, and d.

In addition, as illustrated in FIG. 9, the image processing unit 155 generates a spectroscopic image by replacing one image pixel with respect to the imaging pixels a, b, c, and d with one image pixel A'.

Note that, in the above-described example, four imaging pixels 122A of 2×2 pixels which are close to each other are set as one pixel group, but the number of pixels is not limited thereto. For example, the central imaging pixel 122A and eight imaging pixels 122A which surround the central imaging pixel 122A may be set as one pixel group, or the adjacent two imaging pixels 122A may be set as one pixel group.

In the embodiment, each of the imaging pixels 122A of the imaging unit 122 is divided by setting the plurality of imaging pixels 122A which are close to each other to one pixel group. In addition, the average value of the wavelength of the light received in the imaging pixel which belongs to the pixel group is recorded as the target wavelength with respect to the divided each pixel group recorded in the light-received wavelength data. In such a configuration, in the imaging pixels 122A which are close to each other, the corresponding variation of the gap size is small and the variation of the light-received wavelength is small as well. Accordingly, it is possible to simplify a configuration of the light-received wavelength data by setting these imaging pixels 122A to be one pixel group, and to decrease the driving amount of the electrostatic actuator or the number of times of measurement by the filter control unit 153, thereby realizing more rapid process.

Other Embodiments

Note that, the invention is not limited to the embodiments described above, and modifications, improvements, and the like within a scope that can achieve the object of the invention are included in the invention.

In the respective embodiments above, an example that the light amount of the target wavelength is acquired by the light of the first peak wavelength or the light of the second peak wavelength among the light beams which is emitted from the wavelength variable interference filter 5 is described, but the embodiment is not limited to the example. For example, the light of the target wavelength may be acquired by light of three or higher order peak wavelength which is emitted from the wavelength variable interference filter 5. The acquisition order is properly set by the initial gap size between the reflection films 54 and 55, and the acquisition target wavelength band.

In the respective embodiments, the acquisition order and the control amount for receiving the target wavelength in each of the imaging pixels are set in such a manner that the driving amount is decreased by the electrostatic actuator 56 in the order close to the initial gap size (in the descending order of gap size). In contrast, for example, the acquisition order and the control amount for receiving the target wavelength in each of the imaging pixels may be set in the order far from the initial gap size (in the ascending order of gap size).

In the respective embodiments, the wavelength variable interference filter 5 is exemplified as the spectroscopic filter, but the embodiment is not limited thereto. As the spectroscopic filter, any filter can be used as long as the filter is capable of performing surface spectroscopy, for example, an acousto-optic tunable filter (AOTF) or liquid crystal tunable filters (LCTF) may be used.

In addition, as the wavelength variable interference filter 5, the light transmission-type etalon element which causes light to transmit in accordance with the size of the gap G1 is exemplified, but the embodiment is not limited thereto. For example, light reflection-type etalon element which causes light to reflect in accordance with the size of the gap G1 may be used.

In addition, specific structure in the practice of the invention can be appropriately changed to other structures and the like in a scope that can achieve the object of the invention.

The entire disclosure of Japanese Patent Application No. 2014-175114 filed on Aug. 29, 2014 is expressly incorporated by reference herein.

What is claimed is:

1. A spectroscopic image acquiring apparatus comprising:
    a wavelength variable interference filter that includes:
        a first reflector;
        a second reflector facing the first reflector; and
        an actuator configured to change a gap between the first reflector and the second reflector,
        wherein the wavelength variable interference filter exits first light including a plurality of first wavelengths corresponding to a first order number, and second light including a plurality of second wavelengths corresponding to a second order number;
    an imaging sensor that includes a plurality of imaging pixels including first and second imaging pixels and that receives the first light and the second light from the wavelength variable interference filter; and
    a processor that is configured to control the actuator so as to change the gap based on received light wavelength data, the received light wavelength data including a control amount for the actuator and an acquisition order of the first light and the second light from the wavelength variable interference filter,
    wherein the processor is configured to change the control amount of the actuator to change the gap in one direction,
    when the processor is configured to set the control amount as a first control amount:
        the first imaging pixel detects a first one of the plurality of first wavelengths; and
        the second imaging pixel detects a second one of the plurality of first wavelengths, wherein the first one of the plurality of first wavelengths and the second one of the plurality of first wavelengths are different from each other, and
    when the processor is configured to set the control amount as a second control amount which is different from the first control amount:
        the first imaging pixel detects a third one of the plurality of second wavelengths; and
        the second pixel detects a fourth one of the plurality of second wavelengths, wherein the first one of the plurality of first wavelengths, the second one of the plurality of first wavelengths, the third one of the plurality of second wavelengths, and the fourth one of the plurality of second wavelengths are different from each other.

2. The spectroscopic image acquisition apparatus according to claim 1,
    wherein the acquisition order is set in an order of changing the control amount of the gap in one direction.

3. The spectroscopic image acquisition apparatus according to claim 1,
    wherein the received light wavelength data includes the control amount of the actuator corresponding to a predetermined target wavelength which is detected by each of the plurality of imaging pixels.

4. The spectroscopic image acquiring apparatus according to claim 3,
    wherein each of the plurality of imaging pixels is divided into a plurality of pixel groups based on a variation of the gap on an optical path of each of the plurality of imaging pixels, and
    wherein the received light wavelength data includes the predetermined target wavelength with respect to each of the plurality of pixel groups and the control amount of the actuator corresponding to the plurality of target wavelength with respect to each of the plurality of pixel groups.

5. The spectroscopic image acquiring apparatus according to claim 3,
    wherein the processor is configured to sequentially change the gap at a measurement interval in accordance with a predetermined wavelength resolution by controlling the actuator, and
    wherein each of the plurality of imaging pixels is divided into a plurality of pixel groups in which a variation of the gap is divided by a length unit which is less than the predetermined wavelength resolution.

6. The spectroscopic image acquiring apparatus according to claim 3,
    wherein the received light wavelength data includes, as the predetermined target wavelength, an average value of a wavelength of one of the first and second lights received by each of the plurality of imaging pixels.

7. A spectroscopic image acquiring method of a spectroscopic image acquiring apparatus, the spectroscopic image acquiring apparatus includes:
    a wavelength variable interference filter that includes:
        a first reflector;
        a second reflector facing the first reflector; and
        an actuator configured to change a gap between the first reflector and the second reflector,
        wherein the wavelength variable interference filter exits first light including a plurality of first wavelengths corresponding to a first order number, and second light including a plurality of second wavelengths corresponding to a second order number;
    an imaging sensor that includes a plurality of imaging pixels including first and second imaging pixels and that receives the first light and the second light from the wavelength variable interference filter; and a processor that is configured to control the actuator so as to change the gap, the method comprising executing in the processor the steps of:

acquiring received light wavelength data including a control amount for the actuator and an acquisition order of the first light and the second light from the wavelength variable interference filter;

changing the gap based on the received light wavelength data;

setting the control amount as a first control amount so that the first imaging pixel detects a first one of the plurality of first wavelengths, and the second imaging pixel detects a second one of the plurality of first wavelengths, wherein the first one of the plurality of first wavelengths and the second one of the plurality of first wavelengths are different from each other; and setting the control amount as a second control amount which is different from the first control amount so that the first imaging pixel detects a third one of the plurality of second wavelengths, and the second pixel detects a fourth one of the plurality of second wavelengths, wherein the first one of the plurality of first wavelengths, the second one of the plurality of first wavelengths, the third one of the plurality of second wavelengths, and the fourth one of the plurality of second wavelengths are different from each other, wherein the processor is configured to change the control amount of the actuator for changing the gap in one direction.

8. A spectroscopic image acquiring apparatus comprising:
a wavelength variable interference filter that includes:
  a first reflector;
  a second reflector facing the first reflector; and
  an actuator configured to change a gap between the first reflector and the second reflector,
  wherein the wavelength variable interference filter exits first light including a plurality of first wavelengths corresponding to a first order number, and second light including a plurality of second wavelengths corresponding to second order number;

an imaging sensor that includes a plurality of imaging pixels including first and second imaging pixels and that receives the first light and the second light from the wavelength variable interference filter; and a processor that is configured to control the actuator so as to change the gap based on received light wavelength data, the received light wavelength data including a control amount for the actuator and an acquisition order of the first light and the second light from the wavelength variable interference filter, wherein the processor is configured to sequentially change the control amount of the actuator for changing the gap in one direction, when the processor is configured to set the control amount as a first control amount:
  the first imaging pixel detects a first one of the plurality of first wavelengths; and
  the second imaging pixel detects a second one of the plurality of first wavelengths, wherein the first one of the plurality of first wavelengths and the second one of the plurality of first wavelengths are different from each other, and when the processor is configured to set the control amount as a second control amount which is different from the first control amount:
  the first imaging pixel detects a third one of the plurality of second wavelengths; and
  the second pixel detects a fourth one of the plurality of second wavelengths, wherein the first one of the plurality of first wavelengths, the second one of the plurality of first wavelengths, the third one of the plurality of second wavelengths, and the fourth one of the plurality of second wavelengths are different from each other.

* * * * *